US011620556B2

(12) United States Patent
Andreou et al.

(10) Patent No.: US 11,620,556 B2
(45) Date of Patent: Apr. 4, 2023

(54) HARDWARE ARCHITECTURE AND PROCESSING UNITS FOR EXACT BAYESIAN INFERENCE WITH ON-LINE LEARNING AND METHODS FOR SAME

(71) Applicant: THE JOHNS HOPKINS UNIVERSITY, Baltimore, MD (US)

(72) Inventors: Andreas G. Andreou, Baltimore, MD (US); Tomas Figliolia, Silver Spring, MD (US)

(*) Notice: Subject to any disclaimer, the term of this patent is extended or adjusted under 35 U.S.C. 154(b) by 600 days.

(21) Appl. No.: 16/626,589

(22) PCT Filed: Jul. 2, 2018

(86) PCT No.: PCT/US2018/040658
§ 371 (c)(1),
(2) Date: Dec. 26, 2019

(87) PCT Pub. No.: WO2019/006474
PCT Pub. Date: Jan. 3, 2019

(65) Prior Publication Data
US 2020/0125979 A1 Apr. 23, 2020

Related U.S. Application Data

(60) Provisional application No. 62/528,023, filed on Jun. 30, 2017.

(51) Int. Cl.
*G06N 7/00* (2006.01)
*G06N 20/00* (2019.01)
(Continued)

(52) U.S. Cl.
CPC .............. *G06N 7/005* (2013.01); *G06F 7/70* (2013.01); *G06N 20/00* (2019.01); *G06F 17/18* (2013.01); *G06K 9/6296* (2013.01)

(58) Field of Classification Search
CPC .. G06F 7/70; G06F 17/18; G06N 7/00; G06N 7/005; G06N 3/0472; G06N 20/00;
(Continued)

(56) References Cited

U.S. PATENT DOCUMENTS

2004/0015458 A1  1/2004  Takeuchi et al.
2008/0294970 A1  11/2008  Gross et al.
(Continued)

FOREIGN PATENT DOCUMENTS

WO    2016/102999 A1    6/2016

OTHER PUBLICATIONS

A. Andreou et al., Bio-inspired System Architecture for Energy Efficient, BIGDATA Computing with Application to Wide Area Motion Imagery, VII Latin American Symposium on Circuits and Systems (LASCAS) Apr. 14, 2016 (Year: 2016).*
(Continued)

*Primary Examiner* — Emily E Larocque
(74) *Attorney, Agent, or Firm* — Johns Hopkins Technology Ventures

(57) ABSTRACT

A reconfigurable computing architecture for Bayesian Online ChangePoint Detection (BOCPD) is provided. In an exemplary embodiment, the architecture may be employed for use in video processing, and more specifically to computing whether a pixel in a video sequence belongs to the background or to an object (foreground). Each pixel may be processed with only information from its intensity and its time history. The computing architecture employs unary fixed point representation for numbers in time, using pulse density or random pulse density modulation—i.e., a stream of zeros and ones, where the mean of that stream represents the encoded value.

5 Claims, 10 Drawing Sheets

(51) Int. Cl.
  *G06F 7/70* (2006.01)
  *G06K 9/62* (2022.01)
  *G06F 17/18* (2006.01)
(58) Field of Classification Search
  CPC .... G06K 9/6278; G06K 9/6296; G06V 10/84; G06T 2207/20076
  See application file for complete search history.

(56) References Cited

U.S. PATENT DOCUMENTS

| | | | |
|---|---|---|---|
| 2009/0228238 | A1 | 9/2009 | Mansinghka et al. |
| 2011/0229032 | A1 | 9/2011 | Ranganathan |
| 2014/0081899 | A1 | 3/2014 | Jonas et al. |
| 2014/0222653 | A1 | 8/2014 | Takayasu et al. |

OTHER PUBLICATIONS

K. Sanni et al., FPGQ Implementation of a Deep Belief Network Architecture for Character Recognition Using Stochastic Computation, 2015 49th Annual Conference on Information Sciences and Systems (CISS), 2015 (Year: 2015).*

R.P. Adams et al., Bayesian Online Changepoint Detection, arXiv:0710.3742v1 [stat.ML], 2007 (Year: 2007).*

J.L. Molin et al., FPGA Emulation of a Spike-Based Stochastic System for Real-time Image Dewarping, 2015 IEEE 58th International Midwest Symposium on Circuits and Systems (MWSCAS), 2015 (Year: 2015).*

T. Figlioia, A. A.G. Andreou, An FPGA multiprocessor architecture for Bayesian online change point detection using stochastic computation, Microprocessors and Microsystems 74, 2020 (Year: 2020).*

T. Figliolia, 2.5D Chiplet Architecture for Embedded Processing of High Velocity Streaming Data, Phd dissertation, Jan. 16, 2018 at https://jscholarship.library.jhu.edu/handle/1774.2/60968 (Year: 2018).*

Badarna, M., et al., "Change point detection in streams" University of Haifa 2009.

Adams, R., et al., "Bayesian online changepoint detection" Cavendish Laboratory, Cambridge 2007.

* cited by examiner

HARDWARE ARCHITECTURE AND PROCESSING UNITS FOR EXACT BAYESIAN INFERENCE WITH ON-LINE LEARNING AND METHODS FOR SAME

CROSS-REFERENCE TO RELATED APPLICATIONS

This application is a 35 U.S.C. § 371 U.S. national entry of International Application PCT/US2018/040658, having an international filing date of Jul. 2, 2018, which claims the benefit of U.S. Provisional Application No. 62/528,023, filed Jun. 30, 2017, the content of each of the aforementioned applications is herein incorporated by reference in their entirety.

STATEMENT REGARDING FEDERALLY SPONSORED RESEARCH

This invention was made with government support under contract no. N000141010278 awarded by the Office of Naval Research, contract no. HR0011-13-C-0051 awarded by DARPA, and contract no. SCH-INT 1344772 awarded by the National Science Foundation. The government has certain rights in the invention.

FIELD OF THE DISCLOSURE

The present disclosure relates to systems and methods for change point detection, and more particularly, for Bayesian online change point detection.

BACKGROUND OF THE DISCLOSURE

Change point analysis (CPA), also known as change point detection (CPD), is the characterization of changes in the parameters of a stochastic process, through the form of sequential data. Often CPA is employed in the segmentation of signals, i.e., to facilitate the process of tracking, identification or recognition Online versions of a Bayesian version of change point analysis were recently formulated. BOCPD is a Bayesian Online Change Point Detection algorithm that allows for online inference with causal predictive filtering processing necessary in real-time systems that interact with dynamic physical environments. One of the key challenges and critiques of Bayesian approaches is the high computational requirement that often necessitates high-precision floating point computations.

BRIEF SUMMARY OF THE DISCLOSURE

A reconfigurable computing architecture for Bayesian Online ChangePoint Detection (BOCPD) is provided. In an exemplary embodiment, the architecture may be employed for use in video processing, and more specifically to computing whether a pixel in a video sequence belongs to the background or to an object (foreground). Each pixel may be processed with only information from its intensity and its time history. The computing architecture employs unary fixed point representation for numbers in time, using pulse density or random pulse density modulation—i.e., a stream of zeros and ones, where the mean of that stream represents the encoded value. Each processor incorporates on-line machine learning that enable a continuous update of processing parameters in the statistical model.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
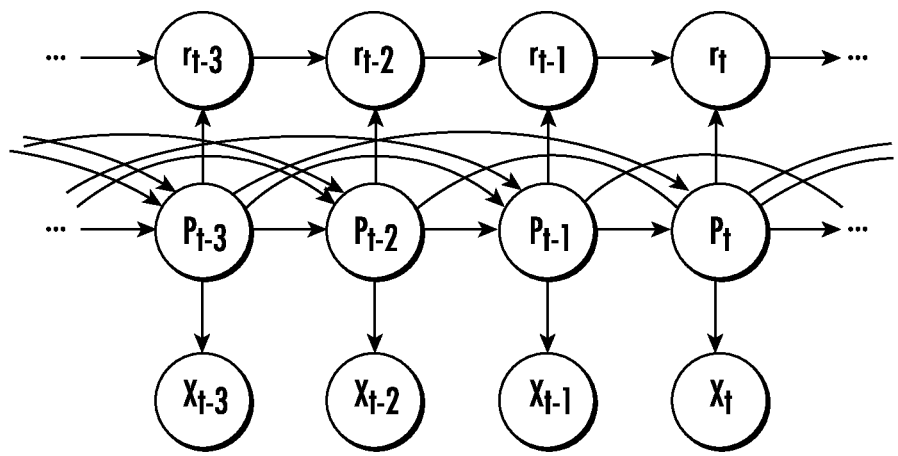
FIG. 1 is a graphical generative model for the Bayesian Online ChangePoint Detection (BOCPD) technique. Parameters P can change or remain the same. The current parameter value $P_t$ can depend on the whole history of parameter values. Run length $r_t$ will be 0 or $r_{t-1}+1$, depending on the values of $P_t$. $x_t$ is a sample from a distribution with parameters equal to $P_t$.

In embodiments, the present disclosure provides a reconfigurable computing architecture for a change-point detector. The architecture may be configured to compute a change point according to the Adams/McKay Bayesian Online ChangePoint Detection technique. In a non-limiting embodiment, the present architecture is suitable for video processing, and more specifically, for computing whether a pixel in a video sequence belongs to the background or to an object (foreground). Each pixel may be processed with only information from its intensity and its time history. The computing architecture employs unary fixed-point representation for numbers in time, using pulse density or random pulse density modulation—i.e., a stream of zeros and ones, where the mean of that stream represents the encoded value. Each processor may incorporate on-line machine learning to enable a continuous update of processing parameters in the statistical model.

Data representation, hardware architecture and processing units that employ probabilistic event representation and computational structures that natively operate on probabilities. A fully programmable multicore processor for exact Bayesian inference is synthesized in hardware description language and as a custom application specific integrated circuit (ASIC). The architecture is programmable and allows computation with precision on demand, allowing to tradeoff power dissipation with performance. Computational elements in the architecture enable on-line machine learning of the hyper-parameters of the predictive probability distribution. As an example of application we use the McKay/Adams Change Point Detection algorithm to perform image segmentation.

The architecture can seamlessly, natively, and optimally perform computationally disparate tasks: optimally perform traditional computing tasks like Image Processing and Radio Frequency (RF) Signal Processing on the same that will also optimally perform cognitive computing tasks like scene understanding and inferential prediction and the native execution of cognitive and machine learning tasks in addition to the traditional image and signal processing tasks.

The extremely low power dissipation of the custom ASIC architecture (10 nJ per exact Bayesian inference) makes the architecture useful in Internet of Things (IoT) and Cyber-Physical (CPS) systems with cognition are systems with cyber technologies, both hardware and software, that interact with physical components and in environments populated by humans. As these technologies have the potential to create competitive advantage for the U.S. economy in the 21$^{st}$ century, research on the topic is thriving. Systems are currently investigated in a variety of sectors, including smart manufacturing (robots that work safely with people in shared spaces), smart grid and utilities (systems for efficient and effective transmission and distribution of electric power, etc.), smart buildings and infrastructure (active monitoring and control of buildings), smart transportation and mobility (vehicle to vehicle communications, autonomous vehicles) and smart healthcare (cyberphysical medical devices). Bayesian On-line Change Point Detection (BOCPD)

Consider a sequence of independent random variables (RVs) $X_1, X_2, \ldots, X_t$. The parameters of the distribution of these RVs can change over time. If that change of parameters could be characterized, then a point of change could be identified. To give an example of such signal, we can consider a simple stream of zeros and ones from a serial line, where the received voltage values at the endpoint can fluctuate due to channel noise. Considering the noise Gaussian with mean equal to zero, the sampled signal will be distributed $\sim N(\mu, \sigma^2)$, where $\sigma^2$ is the fixed variance of the channel noise, and $\mu$ is the actual value to transmit, for instance 0 V or 5 V. In this case $\mu$ is the only parameter that changes over time, but a model in which $\sigma^2$ changes can be considered as well. Samples are distributed normally with parameters $\mu$ and $\sigma^2$, and those parameters can also be considered drawn from another distribution $P(\mu, \sigma^2)$. For the example mentioned before, we can assume that $\sigma^2$ is fixed, but $\mu$ is drawn from a Bernoulli distribution, with a p probability of sending 5 V, and a (1−p) probability of sending 0 V.

We now introduce the run-length concept, which is the number of consecutive samples that have been drawn from the same distribution (the parameters' values didn't change for all of the samples in that run). At time t, $r_t$ is the number of past samples corresponding to that run. If $r_t=k$, then the samples that are considered to be part of that run are $x_{t-k}, x_{t-(k+1)}, \ldots, x_{t-1}$. A distinction has to be made between the RV X and a sample from that random variable x. We will notate the xs from a run $r_t=k$ to be $x_t^{(r=k)}$. In FIG. 1 we show a graph that captures the ideas mentioned. The nodes with P are the ones that contain the parameters of the distribution from which we sample to obtain the xs. The change of the parameter values $P_{t-k}$ will trigger a reset in the count $r_{t-k}$, setting it to 0. On the other hand, if the parameter $P_{t-k}=P_{t-(k+1)}$ then $r_{t-k}=r_{t-(k+1)}+1$.

Figure 2:
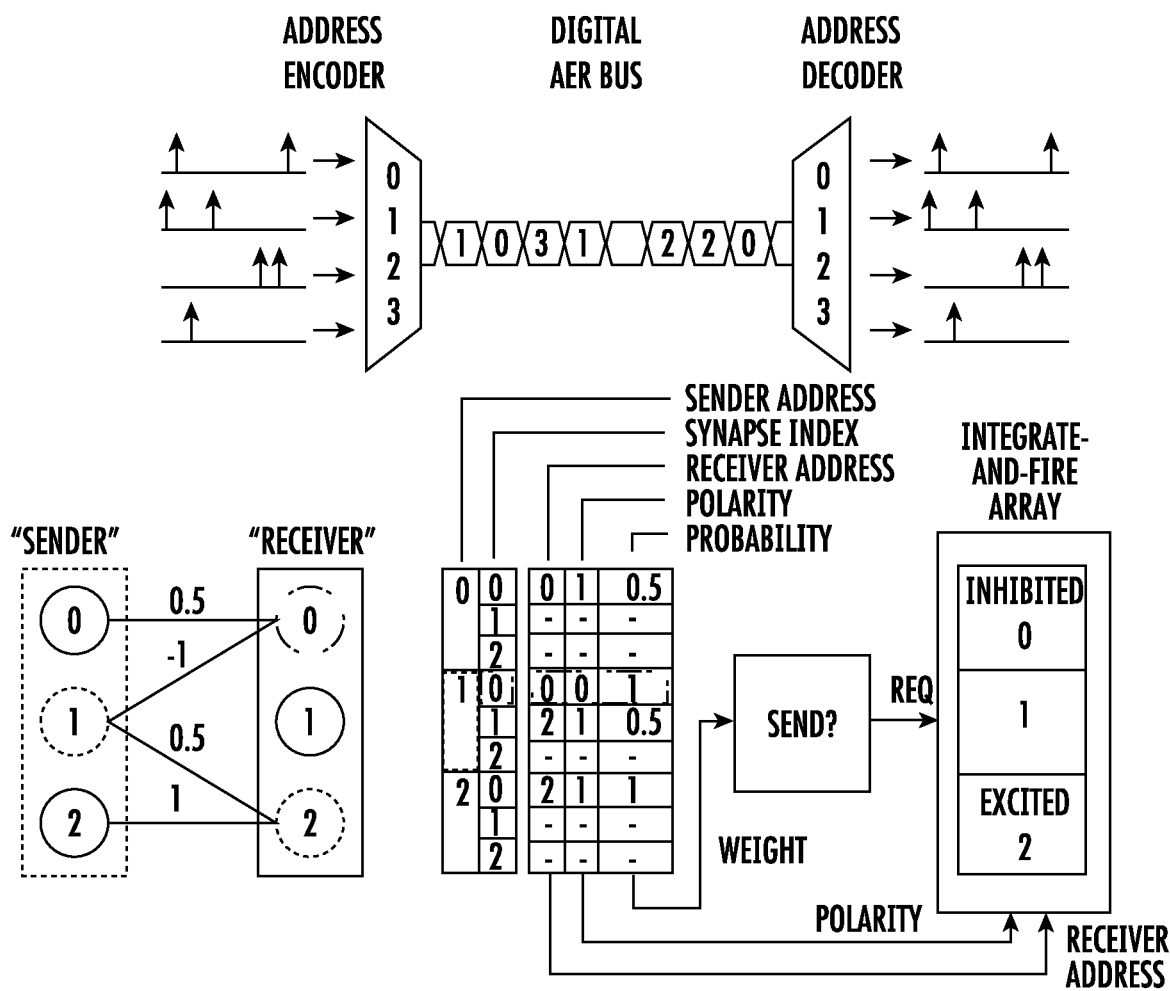
FIG. 2 (Left) Time-multiplexed Address Event Representation (AER) bus. (Right) Mapping of a two-layer network into a Probabilistic Address Event (PAE) look-up table with transmission probabilities. In this example, sender 1 sends a PAE. An inhibitory PAE is transmitted to receiver 0 with 100% probability, and then an excitatory PAE is transmitted to receiver 2 with 50% probability. The synaptic connection table is stored in a random-access memory (RAM). The first two columns comprise the memory address, and the remaining columns comprise the memory data.

The objective of this algorithm is to predict, based on history, what is the probability density function $P(r_t|X_{1,t}=x_{i,t})$. Note that for this algorithm, at every time step, there is a distribution P $(r_t|X_{1:t}=x_{1:t})$, where $r_t$ can take values from 0 to t. At the bottom of FIGS. 2, 3, and 4 in Ryan Prescott Adams and David J. C. MacKay's paper titled "Bayesian Online Changepoint Detection," one can see in greyscale at each point in time the distribution $P(r_t|X_{1:t}=x_{1:t})$. It is through the usage of this distribution that, with a certain level of confidence, a point of change can be called.

For finding changes in the underlying distribution from which samples are obtained over time, the change in the run-length distribution is analyzed with every new sample received. The expression for the run-length distribution is:

$$P(r_t|X_{1:t}) \propto P(r_t, X_{1:t}) = \qquad (1)$$
$$\sum_{r_{t-1}} P(r_t|r_{t-1})P(X_t|r_{t-1}, X_{t-1}^{(r_{t-1})})P(r_{t-1}, X_{1:t-1}) \propto$$
$$\sum_{r_{t-1}} P(r_t|r_{t-1})P(X_t|r_{t-1}, X_{t-1}^{(r_{t-1})})P(r_{t-1}, X_{1:t-1})$$

$$P(r_t|r_{t-1}) = \begin{cases} H(r_{t-1}+1) & \text{if } r_t = 0 \\ 1 - H(r_{t-1}+1) & \text{if } r_t = r_{t-1}+1 \\ 0 & \text{if otherwise} \end{cases} \qquad (2)$$

We see in Equation (1), at time t, $P(r_t|X_{1:t})$ depends on the same distribution for the previous sample at time t−1. This dependency allows this algorithm to be run online. In our implementation $H(r_{t-1}+1)=1/\lambda$. For the second term in 1, for every $r_{t-1}=k$, we can demonstrate:

$$P(X_t|r_{(t-1)} = k, X_{t-1}^{(r_{t-1}=k)} = x_{t-1}^{(r_{t-1}=k)}) = \quad (3)$$

$$P(X_t|X_{t-k:t-1} = x_{t-k:t-1}) = \int_{\forall \vec{\theta}} P(X_t, \vec{\theta}|X_{t-k:t-1} = x_{t-k:t-1}) =$$

$$\int_{\forall \vec{\theta}} P(X_t|\vec{\theta}, X_{t-k:t-1} = x_{t-k:t-1}) P(\vec{\theta}|X_{t-k:t-1} = x_{t-k:t-1}) =$$

$$\int_{\forall \vec{\theta}} P(X_t|\vec{\theta}) P(\vec{\theta}|\vec{\phi}_k) = P(X_t|\vec{\phi}_k)$$

We assume the dependence on the past samples $x_{t-1}^{(r_{-1}=k)} = x_{t-k:t-1}$ through $\vec{\phi}(X_{t-k:t-1} = x_{t-k:t-1})$, the estimator of parameters $\vec{\theta}$. We can see that for every k chosen we have a set of parameters $\vec{\phi}_k(X_{t-k:t-1} = x_{t-k:t-1})$ The $\vec{\theta}$ are the random variables of the distribution $P(\vec{\theta}|\vec{\phi}_k)$. It can be shown that:

$$P(\vec{\theta}|X_t, \vec{\phi}_k) \propto P(X_t|\vec{\theta}) P(\vec{\theta}|\vec{\phi}_k) \quad (4)$$

If the right term in Equation (4) can be formulated, then an expression for (3) can be found, and then the expression for the distribution in (1) is finally unveiled. An assumption is made here, that $P(X_t|\vec{\theta})$ in (4) is normal $\sim N(\sigma^{-2}, \mu)$, with $\vec{\theta} = \mu$ ($\sigma^2$ fixed), and $P(\vec{\theta}|\vec{\phi}_k)$ is a Gaussian prior $\sim N(\mu_{ok}, \sigma^2)$, where $\vec{\phi}_k(\mu_{ok}(x_{t-k:t-1}), \sigma^2(x_{t-k:t-1}))$ The Gaussian distribution chosen for $P(X_t|\vec{\theta})$, is the conjugate distribution of the prior and posterior in Equation (4), and hence the posterior $P(\vec{\theta}|X_t, \vec{\phi}_k)$ is Gaussian. These are the expressions of the updated parameters $\vec{\phi}_k' = (\sigma_{ok}^2, \mu_{ok})$ due to a new received sample:

$$\mu'_{ok} = \frac{\sigma_{o(k-1)}^2 x_t + \mu_{o(k-1)} \sigma^2}{\sigma_{o(k-1)}^2 + \sigma^2} \quad (5)$$

$$\sigma'_{ok} = \left(\frac{1}{\sigma^2} + \frac{1}{\sigma_{o(k-1)}^2}\right)^{-1}$$

When obtaining $P(X_t|\vec{\theta})$ (the last piece missing in Equation (1)), through integration of the $\vec{\theta}$ variables in (3), this distribution turns out to be a Gaussian with parameters $\mu_k = \mu_{ok}$ and $\sigma_k^2 = \sigma^2 + \sigma_{ok}^2$. We finally have all the required pieces for turning the CPD into its online version BOCPD, performing updates with each new received sample.

BOCPD Algorithm Description

Having developed the mathematical framework, we now outline the implemented process step by step.

1. Initialize. $r_{(t=0)}$ can only take one value, 0, and then we have $P(r_{t=0}=0)=1$. If for some reason we know something about the process before time t=0, we can start with another distribution $P(r_{t=0})=S(r)$. We will use here the exemplary case in which we know nothing about the time before t=0.

At each time step, r will have the possibility of being different values, and since the whole last subsection was developed for a particular value of r=k, then for every value of r we will have a different set of values for $\mu_0$, v, a, and b for the case of the gamma inverse prior, and $\mu_0$ and $\sigma_0$ for the case of the normal prior. We will consider $\vec{\theta}$ to be $\mu_0$, v, a, and b for the case of the gamma inverse prior and $\mu_0$ and $\sigma_0$ for the normal prior. We set $\vec{\theta}$ to the initial values $\underline{\theta}_0$.

2. Observe New Datum $X_t$.
3. Evaluate the predictive probability.

$$P(X_t|r_{t-1}, X_{t-1}^{(r)}) = \pi_t^{(r)} \quad (6)$$

4. Calculate Growth Probabilities.

$$P(r_t = r_{t-1} + 1, X_{1:t}) = P(r_{t-1}, X_{1:t-1}) \pi_t^{(r)}(1 - H(r_{t-1})) \quad (7)$$

5. Calculate Changepoint Probabilities. In this step, if we find the probability to be high enough, we can say that we are in presence of a changepoint.

$$P(r_t = 0, X_{1:t}) = \sum_{r_{t-1}} P(r_{t-1}, X_{1:t-1}) \pi_t^{(r)} H(r_{t-1}) \quad (8)$$

6. Calculate evidence $$P(X_{1:t}) = \sum_{r_t} P(r_t, X_{1:t}) \quad (9)$$

7. Determine Run Length Distribution $$P(r_t|X_{1:t}) = P(r_t, X_{1:t}) / P(X_{1:t}) \quad (10)$$

8. Update the parameters. For a concise explanation, we provide an example (intended to be non-limiting). At time t=1, r can be either 0 or 1, so we have now two sets of parameters, and the second set of parameters, for which r=1, will be updated using the parameters corresponding to the previous time step for r=0. This happens for all the values of r except r=0 for which we start with the parameters from step 1.

$$(\vec{\theta})_t^{r+1} = f(X_t, (\vec{\theta})_{(t-1)}^r) \quad (11)$$

9. Return to Step 2

Probabilistic Computation

An architecture that operates natively with probability data structures is advantageous for effective and efficient processing of data using probabilistic techniques. Stochastic computation employs unary representation in contrast to the binary representation employed in modern computer systems. Primarily famed for mapping complex computations into simple bit-wise logic operations, and an error-tolerant encoding, stochastic computation failed to gain much popularity during its earlier years because of relatively lower accuracy and longer computation time compared to conventional methodologies. Capitalizing on its strengths, stochastic computation has been successfully implemented for neural computation, image processing, parity check (LPDC) decoding. More recently, probabilistic computation and address event-based representation (FIG. 2) was introduced in neuromorphic architectures, in Deep Belief Networks, and in general purpose imager processing pipeline for motion imagery.

Figure 3:
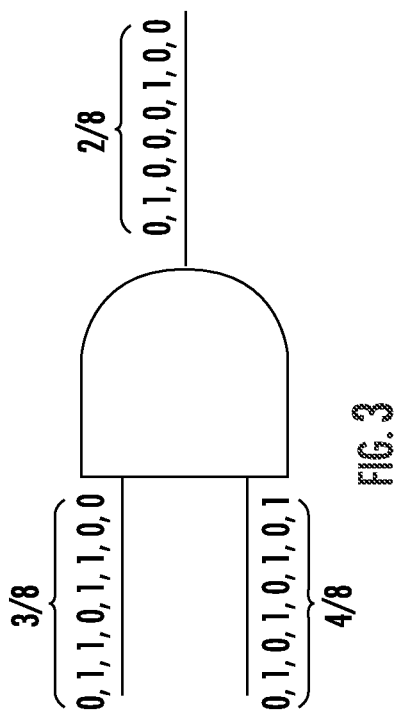
FIG. 3 is a diagram depicting a stochastic circuit implementing multiplication, where two streams encoding a probability of 0.5 are multiplied to produce a stream encoding 0.25.

Computation in unary stochastic representation of data maps to simpler logic functions. For example, with uncorrelated probabilistic unary streams, multiplication can be implemented with an AND gate in a unipolar coding format, where 0s represents 0, and 1s represent 1 in the stream. An example of this computation is shown in FIG. 3.

These streams can be decoded back to their initial encoding by integrating the streams, and normalizing to its range. For a digital design with binary inputs, this can be done with a counter. The sum of these Bernoulli trials in the stream, normalized to the probability space of [0,1], give rise to a Binomial-distributed random variable, $$y = \frac{1}{N}\sum_{i}^{N} I(x_i = 1) \qquad (12)$$

where I(*) is the indicator function, N is the sample size, and $x_i$ is a Bernoulli-distributed sample in the stream.

Analyzing this distribution, reveals an inverse-proportional relationship between the variance $\sigma^2$, and the sample size N. Mathematically, this is seen as, $$\sigma^2 = \frac{p(1-p)}{N} \qquad (13)$$

where p is the probability of getting a 1 in each sample, that is the mean of the Bernoulli trial.

Figure 4:
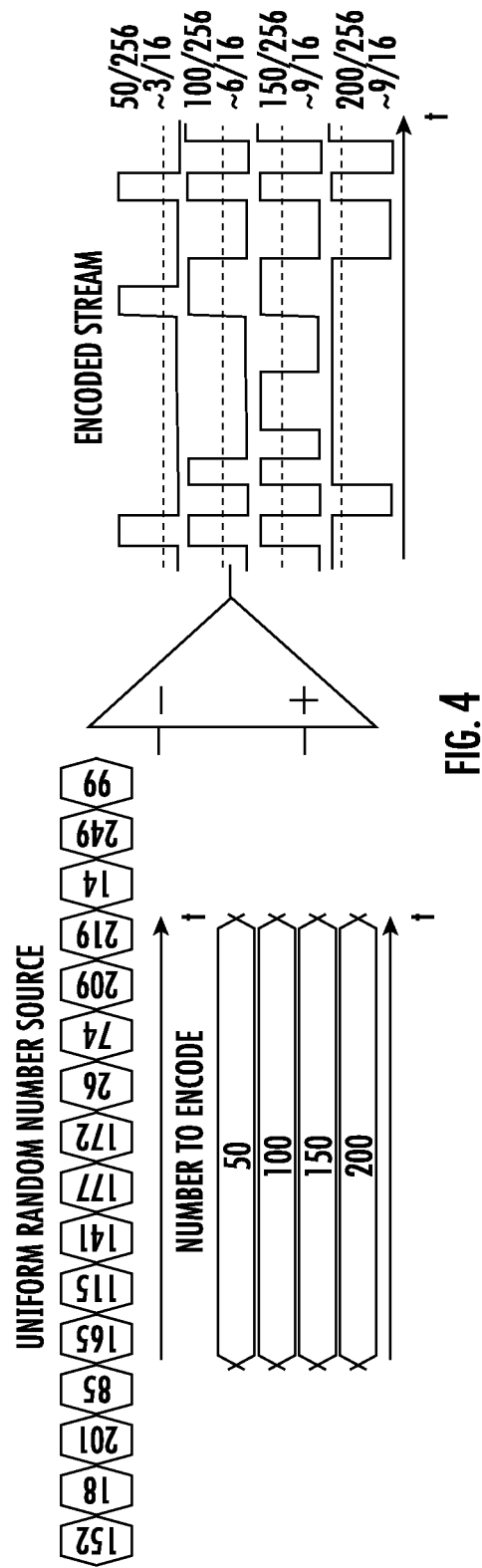
FIG. 4: Domain translation from binary encoded to probabilistic representation. In this example, both inputs to the digital comparator were 8 bits. The four numbers encoded were 50, 100, 150, and 200. Every time a random sample was lower than the value to represent, a one was sent at the output of the comparator. Due to the 8 bit representation of the values, the encoded values translated into probabilities were 50/256, 100/256, 150/256, and 200/256. As we can see, the mean at the output resembles the encoded value, and as more time is used to decode the encoded value, less variance is achieved in the estimation. It is evident from this example that encoded values using the same random number source display high levels of correlation, and for this reason, some stochastic architectures may require independent random number sources for each encoded value.

With variance $\sigma^2$ directly related to the precision of the computation, there exists a trade-off between computation precision and latency. Computing over longer stochastic streams nets lower variance in the outputs, and thus more precise results. In the computing architecture presented in embodiments of this disclosure, state values are stored in registers in binary base due to the compactness of representation. The distinction of this architecture with respect to others is that when performing any kind of computation, these state values are translated into a probabilistic representation through the usage of uniform random number generators (URNGs). Computations in this new domain allow robustness against EM noise in bit flipping, reduction in silicon area in comparison to conventional computational units such as adders, multipliers and dividers, and to control power consumption through management of accuracy. The domain translation in state variables is done utilizing a digital comparator, the state variable's value to encode in binary base and a URNG (FIG. 4). The key to processing stochastically is to perform an accurate domain transformation, meaning that reliable independent URNGs are advantageous. Even if linear-feedback shift registers (LFSRs) are deterministic sources, their pseudo-random characteristics allowed them to be used as URNGs in embodiments of the present design. But one has to keep in mind that one of the disadvantages of LFSRs is that, if a large number of random sources is required in a given design, avoiding correlation artifacts becomes an issue. Not only that, if LFSRs are k∈N bits wide, only $2^k-1$ random sources will have low correlation, making it impossible for architectures requiring more than $2^k-1$ random sources with k bits of accuracy to work. It is for this reason that replacing LFSRs with arrays of true URNGs may enhance proper scaling of stochastic architectures.

The second constraint that probabilistic representation exhibits is that all of the encoded values need to represent a probability which is bounded to [0,1]. This requires some ingenious thinking to shape formulations of problems so that they can be solved stochastically. The same numeric value can be represented using different probabilities, depending on the maximum number of bits used to represent binary numbers. For instance, 64 can be Bernoulli probability p=64/256 for n=8, or p=64/512 for n=9 and so on.

Stochastic Architecture for BOCPD Image Segmentation

The change point detection algorithm is employed in a brain-inspired system architecture for real-time high velocity BIGDATA processing, that originates in large format tiled imaging arrays used in wide area motion imagery ubiquitous surveillance. High performance and high throughput is achieved through approximate computing and fixed-point arithmetic in a variable precision (6 bits to 18 bits) architecture. The architecture implements a variety of processing algorithms classes ranging from convolutional networks (ConvNets), to linear and non-linear morphological processing, probabilistic inference using exact and approximate Bayesian methods and ConvNet based classification. The processing pipeline is implemented entirely using event-based neuromorphic and stochastic computational primitives.

Figure 5:
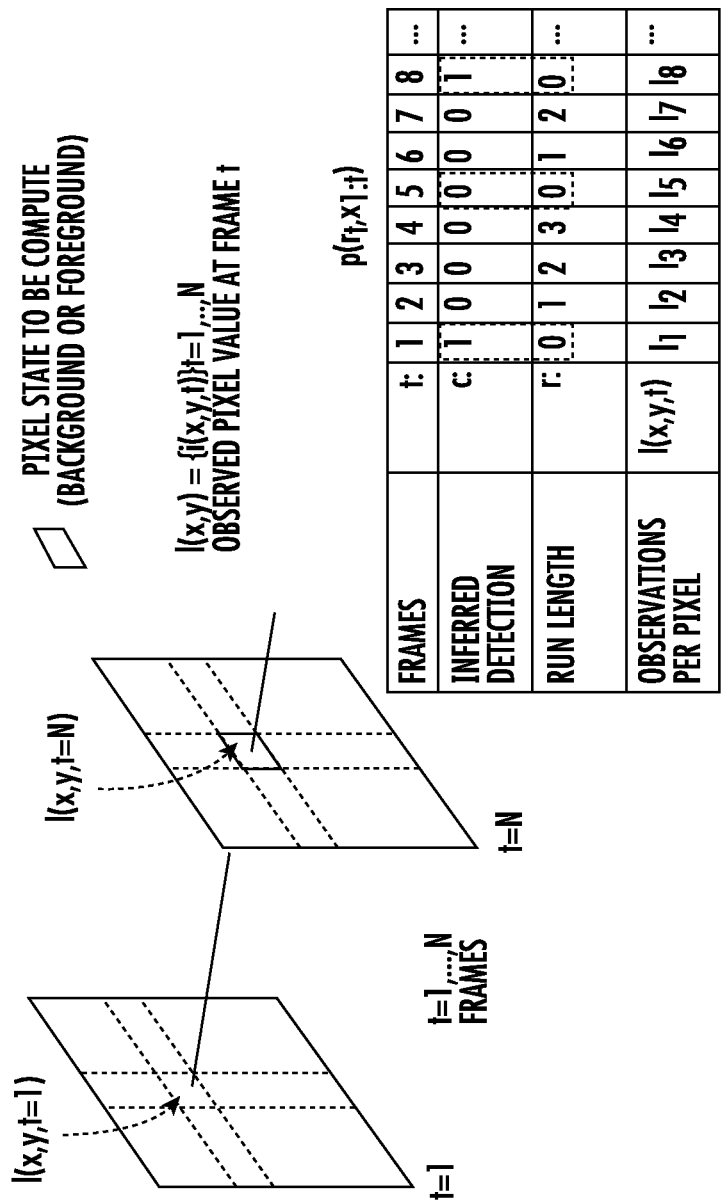
FIG. 5: Change point detection applied to image segmentation at the pixel level.

In a particular non-limiting embodiment (used to illustrate the present disclosure), the BOCPD architecture may be useful for video processing, and more particularly to computing whether a pixel in a video sequence belongs to the background or to a moving object (image segmentation). Each pixel may be processed with only information from its intensity and its time history (FIG. 5).

Core Architecture

In real online implementations of the algorithm, runlength $r_t$ cannot be allowed to diverge to infinity, and a bound may be set. In the present CPD implementation, $r_t$ can be assigned a maximum value. We will call Nwin the maximum time window in the past we can observe. At time t=(Nwin−1) a set of (Nwin−1) parameters $\vec{\phi}_k$ has already been generated and is already available, with the addition of the default parameters $\vec{\phi}_0$ (bias parameters). Since up to Nwin values are stored for the runlength distribution $P(r_t|X_{1:t}=x_{1:t})$, with the next $x_{t=Nwin}$ sample, parameters $\vec{\phi}_k=(\sigma_{ok}^2,\mu_{ok})$ for k=1, ..., Nwin−1 are updated, and the ones for k=Nwin are not generated. The probability value that would have been assigned to $r_{Nwin}$=Nwin, will be added to the probability calculated for $r_{Nwin}$=Nwin−1. As such, $r_t$ is always limited to a constant number of Nwin values over time. Furthermore, we will have to assign $P(r_t=Nwin-1|\vec{\phi}_{(Nwin-1)})+P(r_t=Nwin|\vec{\phi}_{(Nwin)})$ to $P(r_t=Nwin-1|\vec{\phi}_{(Nwin-1)})$. By doing this, $P(r_t=Nwin-1|\vec{\phi}_{(Nwin-1)})$ can be interpreted as the probability of changepoint not only for $r_t$=Nwin−1, but for all $r_t \geq$ Nwin−1.

Figure 6:
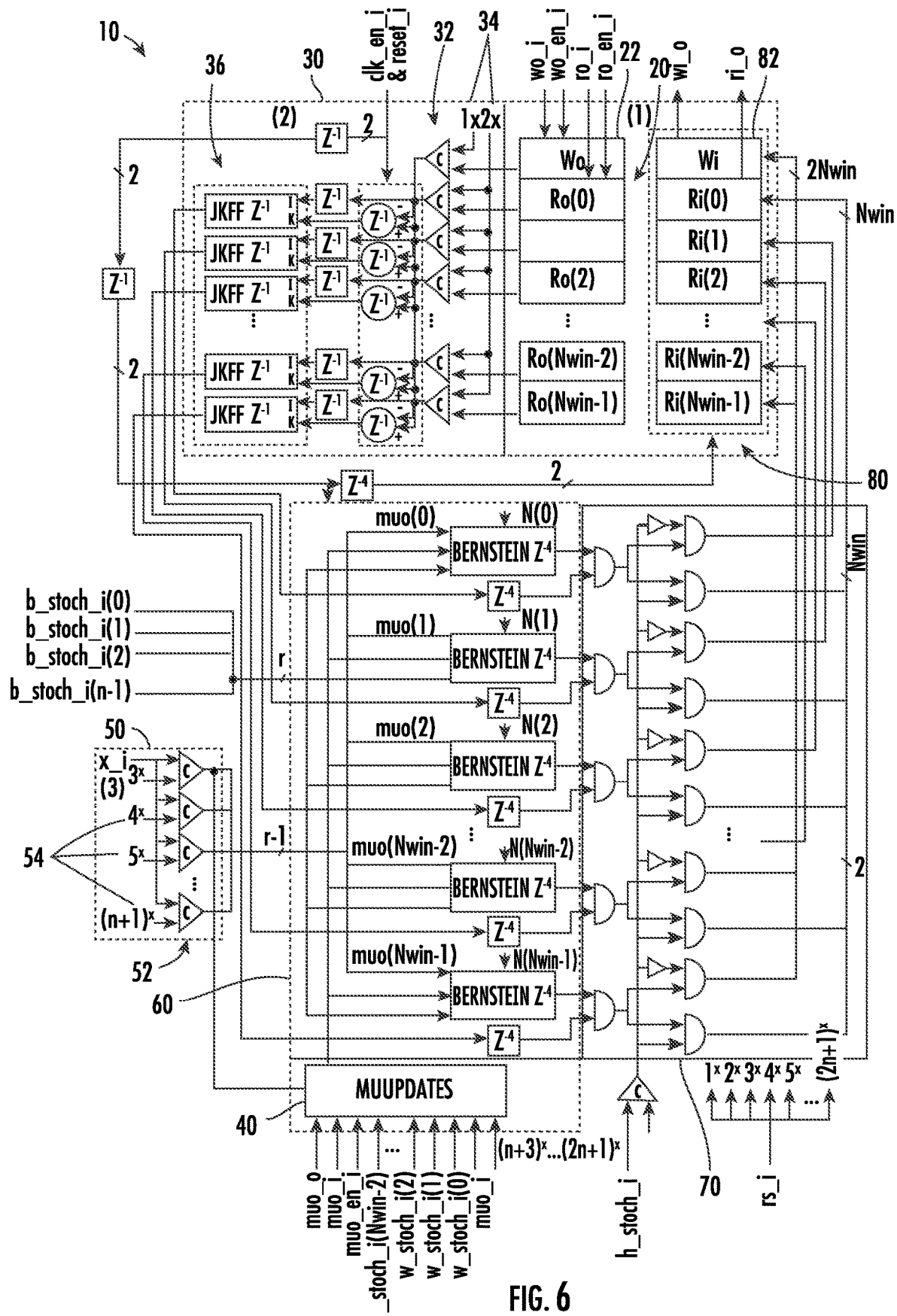
FIG. 6: General stochastic architecture for the CPD algorithm.

We now present the architecture 10 designed for this algorithm in FIG. 6. For this proposed architecture 10, two frequencies are defined, the frequency at which samples are received ($F_{samp}$), and the frequency corresponding to the processing of every new sample ($F_{proc}$). For instance, lets assume a new sample is received every millisecond, 1 ms is then available to perform processing on that sample. Depending on the frequency used, 1 ms can represent different number of clock cycles that can be employed in the processing of that sample. If $F_{proc}$ is 100 KHz, then 100 clock cycles are employed, if the frequency is 1 MHz, then 1000 clock cycles are employed. In our architecture, the number of clock cycles employed is programmable, and range from $2^8$ to $2^{16}$. If both frequencies $F_{samp}$ and $F_{proc}$ are set, but additional clocks cycles are required to process a sample, an alternative would be to diversify in space, meaning that instead of having stochastic streams of N clock cycles, double the number of stochastic streams can be employed (with the additional need of URNGs) cutting in half the number of clock cycles assigned to each of those streams. We can see here the resemblance with nature and neural networks. If all computations had to be performed on a single stochastic line, then very high $F_{proc}$ frequencies would be needed, but instead what the brain does is diversify in space, making $F_{proc}$ a very low frequency, between 100

Hz and 2000 Hz. We can see this in the massive connectivity of dendrites a single neuron has, which is in the order of thousands. The exemplary architecture 10 depicted in FIG. 6 does not diversify in space with the objective of keeping the employed silicon area as small as possible, but it is considered within the scope of the present disclosure as one having skill in the art would be able to implement such an embodiment in light of the present disclosure. Hence, the more clock cycles employed, the more accurate the computation becomes. The architecture 10 includes Ro registers 20 (i.e., Ro(0), . . . , Ro(Nwin-1)) that will represent the probability distribution values for $P(r_{t-1}|X_{t-k:t-1}=x_{t-k:t-1})$ These Ro registers 20 simply represent count values (integer values), and they do not necessarily represent the normalized version of $P(r_{t-1}|X_{t-k:t-1}=x_{t-k:t-1})$. This last statement means that, if each of the Ro(i) with i∈0,1, . . . , Nwin-1 registers 20 is k bits wide, then $\Sigma_{i=0}^{Nwin-1} Ro(i)$ will not necessarily be $2^k$. A register Wo 22 will store the sum of all the values in registers Ro=(i)∈0,1, . . . , Nwin-1, making it the normalizing constant for the before-mentioned distribution.

With the arrival of a new sample at a sample input 50, all of the values in the Ro registers 20 need to be probabilistically encoded. As such, the architecture includes an encoder 30. As described above, a set of comparators 32 and URNGs 34 are used to generate the stochastic streams. Even if there are Nwin+1 register values for Ro and Wo, only two URNGs 34 may be needed by the depicted encoder 30 because computations do not intersect between any Ro(i) and Ro(j) with i≠j streams. The total number of URNGs (2n+1) used in the depicted architecture 10 is shown at the bottom right corner of FIG. 6. The meaning of the value n will be addressed later. So that we can normalize the distribution stored in Ro, we take advantage of the statistical characteristics at the output of a JK flipflop (JKFF) 36. By using stochastic adders, binary comparators, and JKFFs, the sum of all the Bernoulli probabilities at the output of the JKFFs 36 will add up to one, making the normalization of $P(r_{t-1}|X_{1:t-1}=x_{1:t-1})$ possible without involving complicated division algorithms.

On the right side of Ro registers 20 we find Ri registers 80 Ri(0), . . . , Ri(Nwin-1) and a Wi register 82 that are configured to store updated probability distribution $P(r_t|X_{1:t}=x_{1:t})$ by the end of the chosen computational time. Every time a new sample $x_t$ arrives, the registers Ro registers 20 and Wo register 22 are loaded with the distribution $P(r_{t-1}|X_{1:t-1}=x_{1:t-1})$ stored by the Ri registers 80 and the Wi register 82, and the Ri registers 80 and Wi register 82 are set to zero. The Ri registers 80 and Wi register 82 are configured to count the ones coming from their respective input stochastic streams. It can be said that these incoming ones and zeros for these counting registers 80 are Bernoulli samples with a certain probability p(i), i∈[0, . . . , Nwin-1] equal to the distribution values $P(r_t=i|X_{1:t}=x_{1:t})$, i∈[0, . . . , Nwin-1]. After the chosen computation time, the resulting count in registers $\vec{R}i$ 80 will represent a scaled estimated version of the $P(r_t|X_{1:t}=x_{1:t})$ distribution. This resulting distribution will not be necessarily normalized because of the nature of this type of stochastic computation. Each value allocated in registers $\vec{R}i$ 80 is the result of an estimator that possess a mean and a variance, and it is because of that variance, that the distribution might not add to the number of clock cycles chosen to compute. Regarding the mean, it can be shown that the true mean of these incoming streams to registers Ri 80 are indeed the distribution $P(r_t|X_{1:t}=x_{1:t})$.

Figure 7:
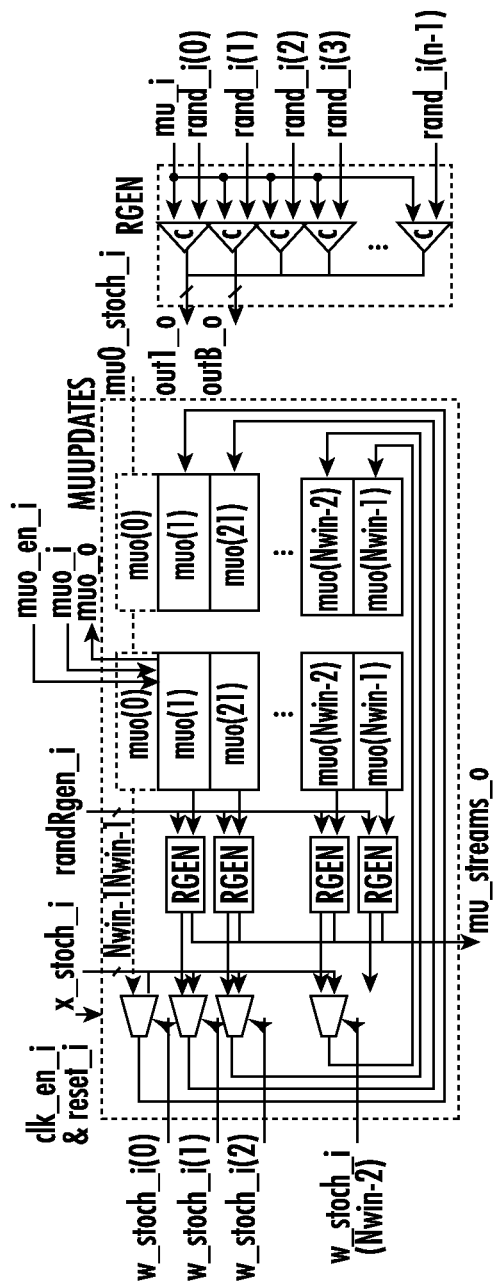
FIG. 7: Stochastic architecture for the update of the $\mu_{ok}$ parameters.

With a similar structure, the parameters from Equation (5) are updated. In fact, notice that the expression for $\sigma_{ok}^{2\prime}$ does not depend on the value of the current $x_t$ sample for all k, and as a result, they are constants. That allows not having to allocate memory for these parameters. In FIG. 7, the inputs w_stoch_i will inject stochastic streams encoding the values $\sigma_{o(k-1)}^2/(\sigma_{o(k-1)}^2+\sigma^2)$ required to update the mean parameters $\mu_{ok}$ for k∈[1:Nwin-1]. The value $\mu t_{o0}$ is actually a constant (represented by stochastic input muO_stoch_i), and is the default value for the mean of the prior (this will generally be 0.5, unless something is known about the analyzed signal that allows to change this bias value). The input x_stoch_i will inject a stochastic stream encoding the current value $x_t$. The way in which registers $m_{u0}$ and $m_{ui}$ are reset and loaded is similar to the Ro and Ri registers. We can also observe in FIG. 7 how the arrows coming out of the multiplexers to the $m_{ui}$ registers go down one level, meaning that $\mu_{ok}'$ depends on $\mu_{o(k-1)}$, as expected. Each of the m register values is encoded in Nwin-1 different stochastic streams, which, along with the w_stoch_i streams, they are processed through the multiplexer that acts as a weighted sum. The streams representing the $\mu_{ok}$ parameters are additionally sent out to the blocks that will compute the Gaussian distributions $P(X_t|r_{t-1}, X_{t-1}^{(r_{t-1})}=x_{t-1}^{(r_{t-1})})$ for the different values of $r_{t-1}$.

Going back to FIG. 6 three different types of stochastic streams can be seen, the ones for the encoded $x_t$ value, the ones corresponding to the mean parameters $\mu_{ok}$ coming out of the MUUPDATES block (mu_update circuit 40), and the Bernstein coefficients streams represented by the inputs b_stoch_i, that will be used to generate the required Gaussian function $P(X_t|\vec{\phi}_k)$. Bernstein polynomials, are polynomials that can be used to approximate any function f(x)=y with x∈[0; 1] and y∈[0; 1], and they rely on the weighted sum of Bernoulli probabilities. If there are k independent stochastic streams encoding probability p, and we perform the addition of all the samples from all of the streams, then the probability of having q as the output addition is a Binomial distribution:

$$P(q) = \binom{q}{k} p^q (1-p)^{k-q} \quad (14)$$

By computing a weighted sum of these probabilities, we can approximate the desired function:

$$f(p) \approx \sum_{i=1}^{k} w_i \binom{q}{k} p^q (1-p)^{k-q} = \hat{f}(p) \quad (15)$$

Figure 8:
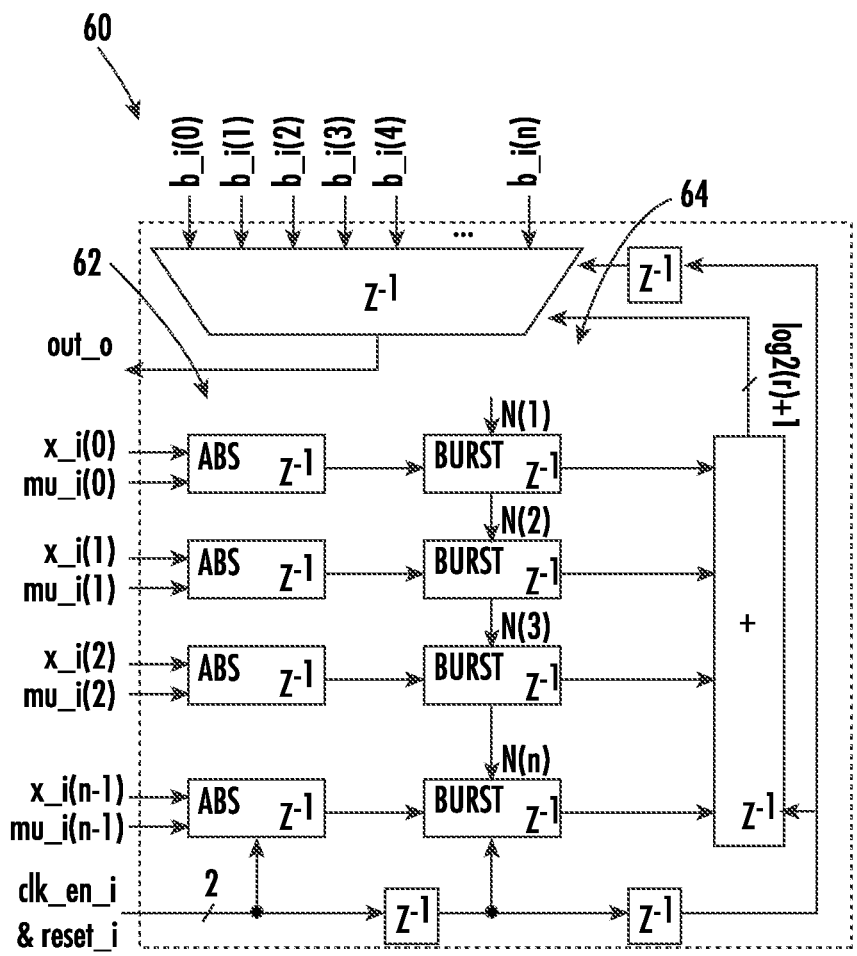
FIG. 8: Stochastic architecture for the Bernstein polynomials function approximation.

In order to make this approximation stochastically feasible, weights $w_i$ are values ∈[0; 1]. An exemplary architecture for this Bernstein polynomial function approximation can be found in FIG. 8. Here we can see the meaning of the constant n, which is the number of coefficients used in the approximation of a function using Bernstein polynomials. By choosing among the different Bernstein coefficient streams with a multiplexer, the desired weighted effect is achieved. The Bernstein block 60 has 2n input stochastic streams representing two values, the sample $x_t$ and the mean $\mu_{ok}$ for a particular value of k. As previously mentioned, the distribution in Equation (3) is a Gaussian, and its parameters are $(\mu_k=\mu_{ok}, \sigma_k^2=\sigma^2+\sigma_{ok}^2)$. The ABS block 62 performs the stochastic absolute value of the difference between the inputs, so that only half of the Gaussian bell needs to be approximated by the Bernstein polynomials. The problem that now arises is that Nwin different Gaussians with Nwin possibly different variances need to be approximated, and for doing that, Nwin different sets of Bernstein coefficients would be needed. This would considerably increase the required number of URNGs. As a solution for this problem, the concept of a bursting neuron (bursting circuit 64) was applied here. If a Gaussian with standard deviation 0.2 was approximated with certain coefficients, how can the same coefficients be used to approximate a Gaussian with standard deviation 0.2/i with i∈N? The approach taken here to normalization takes inspiration from biology where some neurons, when excited, will generate a train of impulses at their output instead of a single spike. Bursting circuits 64 are configured to generate i ones at its output for every one at its input—a multiplication by i will be taken place. With the latter as the input for the Bernstein function approximation, then the domain axis for f(p) is shrunk by i, and the Gaussian with standard deviation 0.2/i could be represented. This injects correlation to the stochastic streams, but it has been proven empirically that the impact on the performance of the architecture is not compromised significantly. The combinatorial circuit 70 after the Bernstein blocks in FIG. 6 can be easily explained considering that the AND gates perform multiplication operations, and the NOT gates perform 1−p, where p is the probability value encoded at the input. This combinatorial circuit 70 calculates the expression presented in Equation (1).

Preprocessing Unit

Figure 9:
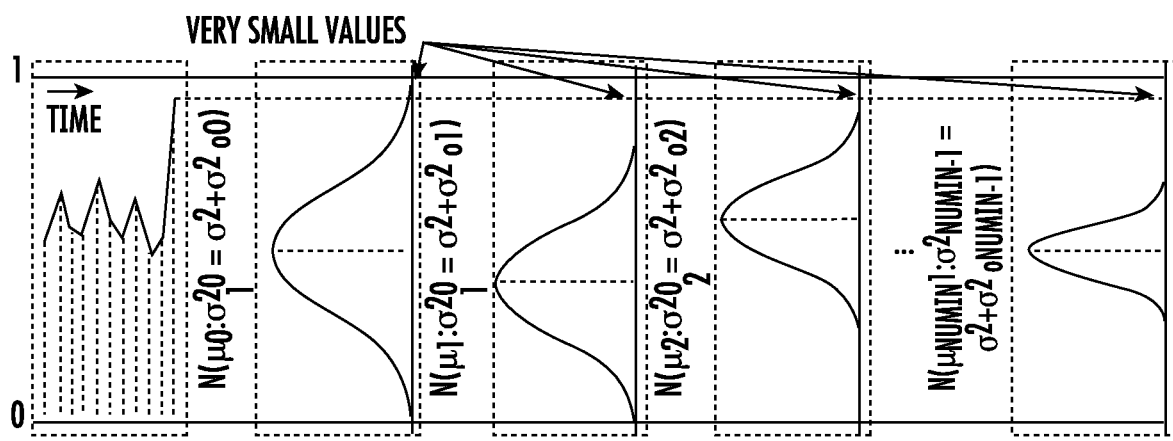
FIG. 9: Floating point vs stochastic precision problem.

As mentioned above, an objective of the ChangePoint Detection algorithm is to find changes in the parameters from the underlying distribution from which samples $x_t$ come from by interpreting the run-length probability distribution $P(r_t|X_{1:t}=x_{1:t})$. Due to the choice of Gaussian distribution for the right expression in Equation (4), we concluded that Equation (1) is Gaussian. Now, if a coming sample $x_t$ is very different from the range of values received in the past, this could mean that there is an outlier or that actually a change in the parameters has taken place. In either case, when sample $x_t$ is very far from the mean values $\mu_{ok}$ and falls where the Gaussian distribution has a very low probability value, the precision for this stochastic implementation gets impaired. This problem can be seen in FIG. 9. If we were dealing with floating point computations, this would not be a problem, because even if $P(X_t|\vec{\phi}_k)$ was a very small value ∀k∈[0:Nwin−1], when normalizing the distribution $P(r_t|X_{1:t})$, we would still obtain meaningful probability values. For the case of the stochastic implementation, if for instance, we were using 1024 time slots to compute $P(r_t|X_{1:t})$ and the values obtained for $P(X_t|\vec{\phi}_k)$ were all lower than 1/1024, then the registers $\vec{R}_i$ will most likely contain all zeros at the end of the processing time, and no meaningful distribution for $P(r_t|X_{1:t})$ would be obtained.

A possible way of addressing this problem is by normalizing the samples received over time, by tracking a slow varying mean for these samples, and amplifying the difference between this mean and the current sample value $x_t$. This can be thought as a high pass filter with a cut-off frequency very close to 0 Hz and a gain greater than one. The stochastic stream sent to the Bernstein block approximator will never encode Bernoulli probabilities greater than 1 because of the nature of stochastic processing, and then when approximating half of the Gaussian bell with the Bernstein polynomials, and performing the filtering and amplifying the values for $x_t$, if the approximation of the Gaussian bell has a minimum value in the [0:1] domain that is greater than 1/Ncomp, where Ncomp is the number of clock cycles chosen for processing each sample, then the values in the registers $R_i$ at the end of the computational process time will not contain all zeros. By not containing all zeros, the architecture can recover easily from this situation. An exemplary embodiment of a stochastic pre-processing unit according to the present disclosure is shown in FIG. 10.

Figure 10:
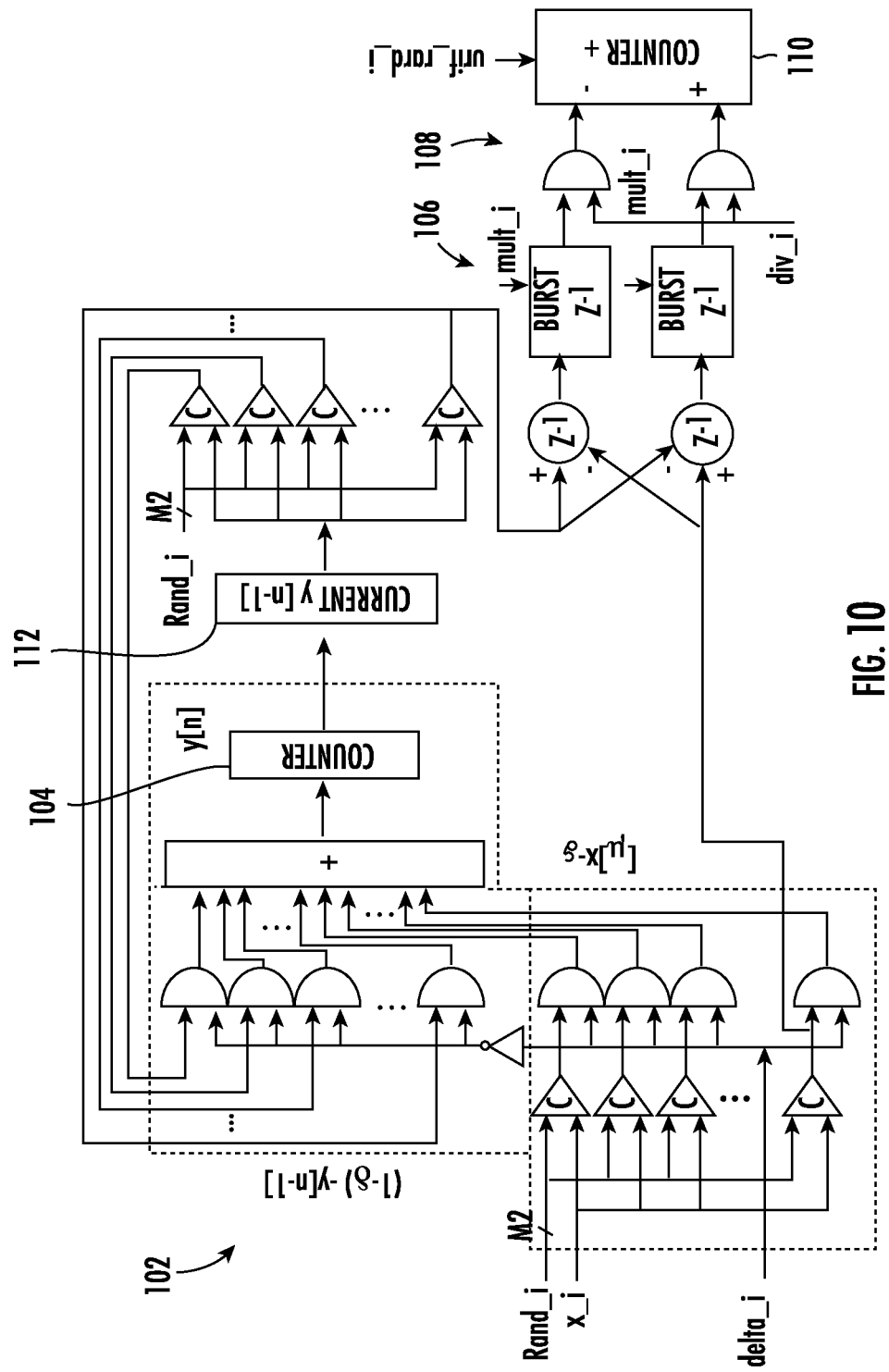
FIG. 10: Architecture for the stochastic pre-processing unit.
Figure 11:
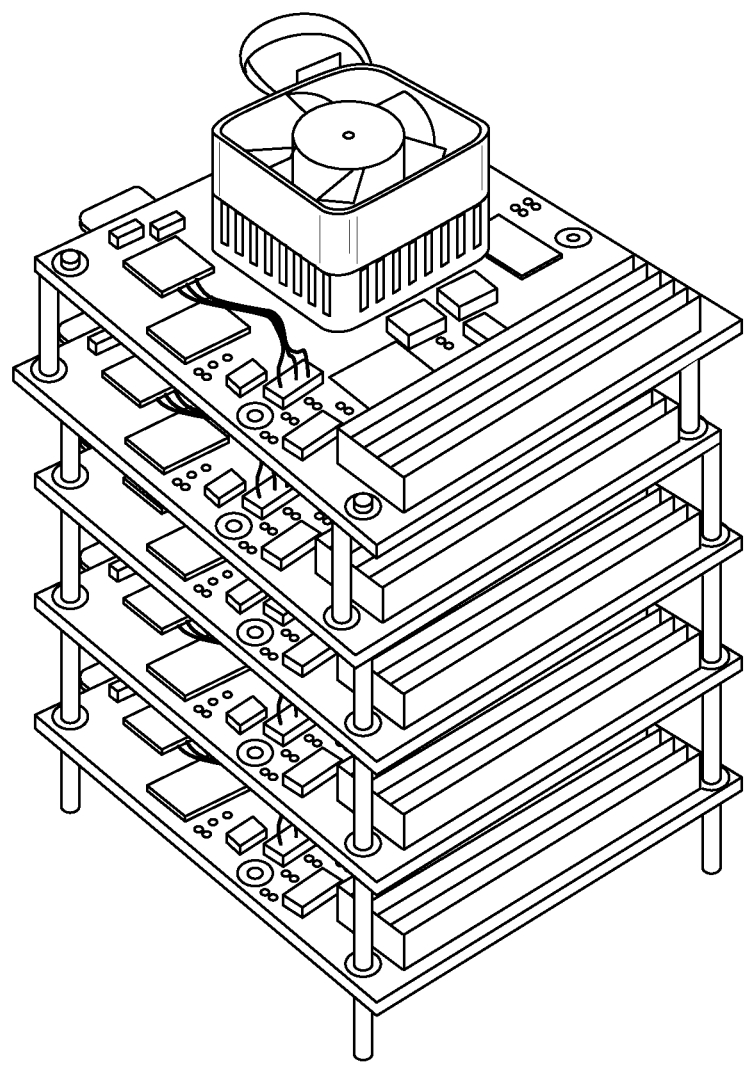
FIG. 11 is a photograph of a test embodiment of the charge point detector according to an embodiment of the present disclosure.

In FIG. 10, we present the architecture of an exemplary preprocessing circuit 100 that adjusts a signal that will be fed to the CPD block. This adjustment is also done in the probabilistic domain. The first stage of the preprocessing unit 100 is a one-pole low-pass filter 102. The iterative equation for this filter 102 is well known, and it is y[n]=δ·x[n]+(1−δ)·y[n−1]. The parameter δ determines the cutoff frequency of the filter 102, smaller values of it will mean lower cutoff frequency. When computing the equation shown, the value of y[n] will be stored in binary base, meaning that a stochastic stream has been decoded for time n−1. The decoding of a stochastic stream brings up problems that if left in the stochastic domain we would not encounter. This is that when decoding, an error of decoding is involved, due to the variance of the estimator used. This variance is inversely proportional to $\sqrt{comp}$. At some point, the value of the filtered input signal will be subtracted from the input signal, and if the error in the filtered signal is of the order of the input signal's standard deviation, then we have a problem. Two complementary solutions were found for this problem. First, the filter 102 was changed to output a new sample every M1 input samples. This means that a counter block 104 shown in FIG. 10 will count for M1·$N_{proc}$ clock cycles. After this time, the value in this counter 104 will be sent to the current y[n−1] circuit 112 and counter register 104 will be reset. In the dashed lines, we observe the three terms in the IIR one pole filter mentioned. This will decrease the decoding error by $\sqrt{M1}$, and it is a viable solution because the input signal's DC component is assumed to change very slowly. Second, additional parallel streams were incorporated for the values y[n−1]·(1−δ) and x[n]·δ. If M2 independent stochastic number streams were used to generate these M2 parallel streams, it is the same as having $N_{comp}$·M2 time slots instead of $N_{comp}$. Considering now the effect of M1 and M2, we would effectively have reduced the error in the decoded value of the filtered signal by $\sqrt{M1 \cdot M2}$. The difference of the filtered signal and the original signal is computed in the stochastic domain. Depending on which of the two signals encodes a higher number, one of the output streams for the subtractions will be zero and the other one will have the difference. The subtraction signals are then amplified by mult_i with Bursting circuits 106 (as described above). It may be advantageous to amplify the subtracting signals so as to distinguish small changes in the mean of the input signal. Finally, the two amplified streams are multiplied 108 by a number lower than 1 (input $div_i$), so that the scaling factor can be any rational number, and we combine them using an output counter 110 that starts at a count representing the number 0.5 that goes up or down depending on the input stochastic values. This way we will always obtain at the preprocessing block output, a signal that is centered at 0.5.

Experimental Embodiment

Figure 12:
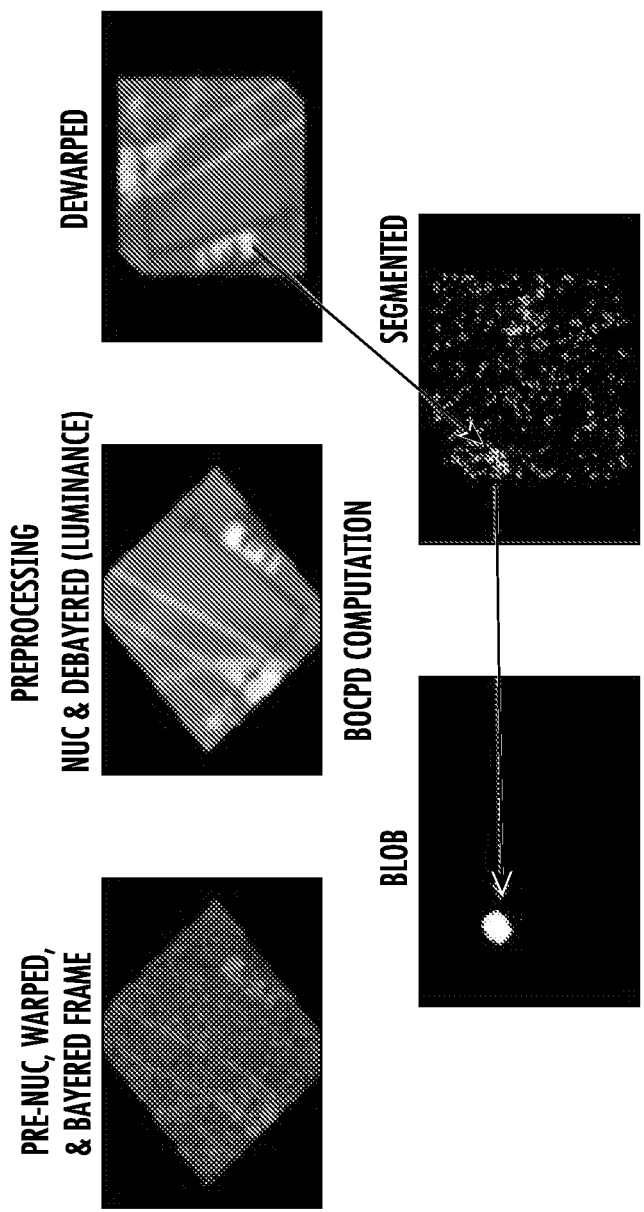
FIG. 12 shows screen captures displaying the results from an image processing pipeline using a change point detector according to an embodiment of the present disclosure. The results of the change point analysis and segmentation algorithm are shown in the two bottom frames of the image processing pipeline, using the resources of one Xilinx Kintex-7 FGPA.
Figure 13:
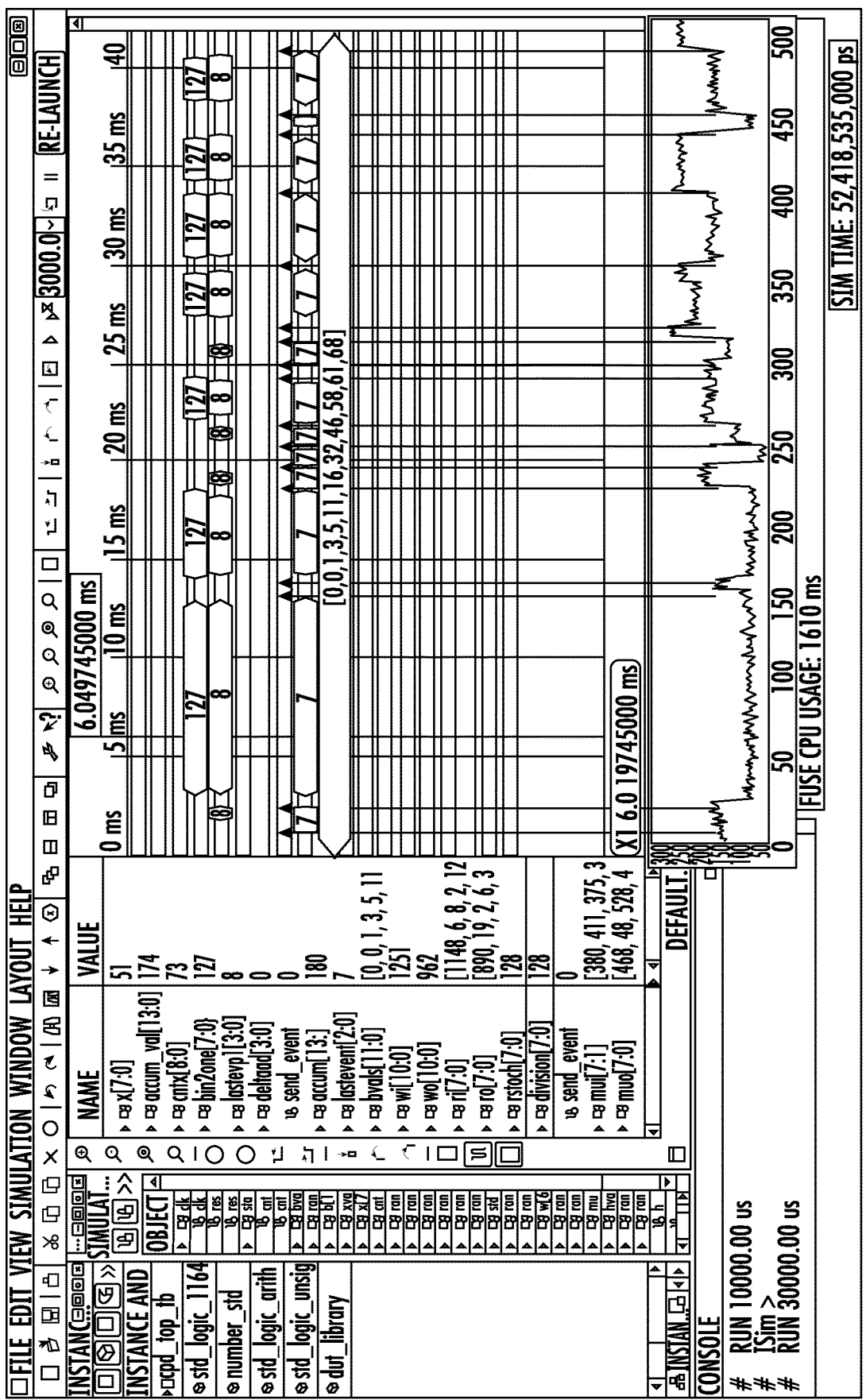
FIG. 13: Results from an experimental embodiment of a CPD FPGA architecture according to the present embodiment. The bottom panel shows a noisy input signal with step changes in the mean value. Signal send-event shows the output of the architecture indicating an event whenever the mean value of the signal changes (white arrows pointing upwards).

An experimental setup using an embodiment of the presently-disclosed architecture was implemented in a Xilinx Kintex-7 FPGA communicating with a host system using USB3 interface and Matlab, featuring 14 CPD cores with their own respective pre-signal adjustment allowing the processing of 120×160 pixel images @ 10 fps. All of the parameters were fixed, including, without limitation, the number of Bernstein coefficients n=5, the processing time 8192 clock cycles, and the time window $N_{win}$=8. The design was written completely parametrically in VHDL, allowing the parameters to be changed and the architecture resynthesized. The disclosed stochastic BOCPD was implemented as part of an image processing pipeline for implementing background-foreground segmentation. Points of change were identified by analyzing the probability distribution obtained for each new sample $x_t$ in 1. This system architecture proved capable of processing in real-time 160×120 raw pixel data running on a reconfigurable computing platform (5 Xilinx Kintex-7 FPGAs 11). The image data was generated by standard cameras and hence the value of the pixels was encoded using pulse density modulation (PDM) so that it was compatible with the computational infrastructure. A screen shot of results from the image processing pipeline up to the segmentation and feature extraction stage is shown in FIG. 12. FIG. 13 shows results obtained in the simulation of the architecture processing a single pixel (scalar) using Isim.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A change point detector, comprising:
    a sample input, configured to receive a sample $x_t$ at a sample frequency $F_{samp}$ and output n stochastic streams representing $x_t$;
    a set of Nwin Ro registers representing a probability distribution value of a prior runlength, $P(r_{t-1}|X_{1:t-1}=x_{1:t-1})$, wherein each Nwin Ro register of the set of Nwin Ro registers is configured to store a count of prior Bernoulli samples;
    a Wo register configured to store a sum of all values in the set of Nwin Ro registers as a normalizing constant for the prior runlength probability distribution value;
    an encoder for probabilistically encoding each value stored by the set of Nwin Ro registers and normalized by the value stored in the Wo register;
    a mu_update circuit having an input for receiving a stochastic stream representing sample $x_t$ and variance $\sigma^2_0$ for calculating mean parameters $\mu_{ok}$ for $k \in [1: Nwin-1]$;
    a set of Nwin Bernstein circuits, each Nwin Bernstein circuit of the set of Nwin Bernstein circuits configured to receive a set of n Bernstein coefficient signals and stochastic streams representing sample $x_t$ and mean $\mu_{ok}$ for a particular value k wherein each Nwin Berstein circuit operates on a value k different from the other Bernstein circuits, and to provide an output of $P(X_t|\vec{\theta}_k)$;
    a set of Nwin combinatorial circuits, each Nwin combinatorial circuit of the set of Nwin combinatorial circuits configured to receive the output from a corresponding Nwin Bernstein circuit and a corresponding encoded Nwin Ro register from the encoder, and wherein a set of combinatorial circuits provide outputs of Bernoulli samples;
    a set of Nwin Ri registers for storing a probability distribution values of a current runlength $P(r_t|X_{1:t-1}=x_{i:t-1})$, wherein each Nwin Ri register of the set of Nwin Ri registers is configured to count Bernoulli samples; received from a corresponding combinatorial circuit of the Nwin combinatorial circuits, and wherein each Nwin Ri register is configured to output its stored value to a corresponding Nwin Ro register each time a new sample $x_t$ is received by the change point detector; and
    a Wi register configured to store a sum of all values of the set of Nwin Ri registers as a normalizing constant for a current runlength probability distribution.

2. The change point detector of claim 1, wherein a Bernstein circuit comprises:
    a set of Nwin ABS circuits configured to output a stochastic absolute value of the difference between $x_t$ and $\mu_{ok}$; and
    a set of Nwin bursting circuits, each Nwin bursting circuit configured to receive the output from a corresponding ABS circuit and generate I ones at an output for every one received at an input.

3. The change point detector of claim 1, wherein the encoder further comprises binary comparators, stochastic adders, and J-K Flip Flops.

4. The change point detector of claim 1, further comprising a preprocessing circuit for normalizing the sample values over time by tracking a slow-varying mean and amplifying the difference between the mean and the current sample.

5. The change point detector of claim 4, wherein the preprocessing circuit comprises
    a one-pole low-pass filter.

* * * * *